United States Patent
Pieczul et al.

(10) Patent No.: US 12,032,935 B2
(45) Date of Patent: Jul. 9, 2024

(54) ENFORCEMENT OF ENVIRONMENTAL CONDITIONS FOR CLOUD APPLICATIONS

(71) Applicant: Oracle International Corporation, Redwood Shores, CA (US)

(72) Inventors: Olgierd Stanislaw Pieczul, Dublin (IE); Deepanjan Pal, Kolkata (IN); Arunkumar Sadasivan, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/728,688

(22) Filed: Apr. 25, 2022

(65) Prior Publication Data
US 2023/0342125 A1    Oct. 26, 2023

(51) Int. Cl.
*G06F 8/41*   (2018.01)
*G06F 8/60*   (2018.01)
*G06F 8/70*   (2018.01)

(52) U.S. Cl.
CPC ............... *G06F 8/447* (2013.01); *G06F 8/43* (2013.01); *G06F 8/60* (2013.01); *G06F 8/70* (2013.01)

(58) Field of Classification Search
None
See application file for complete search history.

(56) References Cited

U.S. PATENT DOCUMENTS

| | | | | |
|---|---|---|---|---|
| 10,643,002 B1* | 5/2020 | Veselov | ................. | G06F 21/00 |
| 11,080,168 B1* | 8/2021 | Choudhury | ......... | G06F 11/3414 |
| 11,550,708 B1* | 1/2023 | Choudhury | ......... | G06F 11/3688 |
| 2007/0043831 A1* | 2/2007 | Kessler | .................. | H04L 67/62 |
| | | | | 709/219 |
| 2014/0033268 A1* | 1/2014 | Julisch | .................... | H04L 63/20 |
| | | | | 726/1 |
| 2014/0053226 A1* | 2/2014 | Fadida | ................ | H04L 63/1408 |
| | | | | 726/1 |

(Continued)

FOREIGN PATENT DOCUMENTS

CN    104360878 A   *  2/2015

OTHER PUBLICATIONS

Mignault et al., "Oracle Application Express Administration," APRESS, 2016, 312pg. (Year: 2016).*

*Primary Examiner* — Ryan D. Coyer
(74) *Attorney, Agent, or Firm* — Kilpatrick Townsend & Stockton LLP

(57) ABSTRACT

Techniques are disclosed for associating environmental condition information with a software component so that the environmental conditions can be automatically verified when a software package containing the software component is deployed. As a result, environmental conditions can be established when a software component is initially developed by the operators who may be best-suited to determine appropriate environmental conditions. Further, environmental condition enforcement can be performed automatically at the time of deployment, without human intervention. For example, when the software component is about to deployed, a deployment system can automatically examine the information about the target environment to verify that target environment satisfies the encoded environmental conditions.

18 Claims, 12 Drawing Sheets

(56) References Cited

U.S. PATENT DOCUMENTS

| | | | | |
|---|---|---|---|---|
| 2015/0199188 A1* | 7/2015 | Mantripragada | ..... | G06F 21/121 717/101 |
| 2015/0312274 A1* | 10/2015 | Bishop | .................... | H04L 63/20 726/1 |
| 2021/0374029 A1* | 12/2021 | Purushothaman | .. | G06F 11/3409 |
| 2022/0210003 A1* | 6/2022 | Nedungadi | ......... | H04L 41/0883 |
| 2023/0231865 A1* | 7/2023 | Velur | ....................... | G06F 8/60 726/25 |

* cited by examiner

400

```
┌─────────────────────────────────────────────────────────────────┐
│ RECEIVE ONE OR MORE ENVIRONMENTAL CONDITIONS TO BE ASSOCIATED   │
│ WITH A SOFTWARE PACKAGE FOR A PARTICULAR SOFTWARE COMPONENT     │
│                            S421                                  │
└─────────────────────────────────────────────────────────────────┘
                                │
                                ▼
┌─────────────────────────────────────────────────────────────────┐
│ STORE THE ONE OR MORE ENVIRONMENTAL CONDITIONS AND CREATE AN    │
│ ASSOCIATION BETWEEN THE ONE OR MORE ENVIRONMENTAL CONDITIONS    │
│                  AND THE SOFTWARE PACKAGE                        │
│                            S422                                  │
└─────────────────────────────────────────────────────────────────┘
```

RECEIVE INFORMATION ABOUT A SOFTWARE PACKAGE THAT HAS BEEN DEPLOYED AT A PARTICULAR TARGET ENVIRONMENT
S631

IDENTIFY A SET OF ONE OR MORE ENVIRONMENTAL CONDITIONS ASSOCIATED WITH THE SOFTWARE PACKAGE
S632

QUERY THE PARTICULAR TARGET SYSTEM FOR CURRENT VALUES OF CERTAIN PROPERTIES OF CERTAIN RESOURCES AS SPECIFIED BY THE ONE OR MORE ENVIRONMENTAL CONDITIONS TO DETERMINE WHETHER THE ONE OR MORE ENVIRONMENTAL CONDITIONS ARE SATISFIED BY THE TARGET ENVIRONMENT
S633

GENERATE A REPORT INDICATIVE OF THE QUERY RESULTS
S634

SEND THE REPORT OR PERFORM ONE OR MORE ACTIONS BASED ON THE QUERY RESULTS
S635

*FIG. 6*

ENFORCEMENT OF ENVIRONMENTAL CONDITIONS FOR CLOUD APPLICATIONS

BACKGROUND

In cloud environments, specific components may be incorporated into various contexts. In some situations, certain parameters should be changed or updated for different contexts in order to maintain secure systems. Responsibility for ensuring that systems are secure is often placed on external environments. For example, software development teams often rely on external environments to have specific configurations for achieving goals related to data integrity and access control.

In one example, a software development team develops an internal component that receives calls from another internal component in the same isolated network of a cloud environment. With both components being located in the same isolated network, it may be acceptable to implement the component that receives the call in a manner that does not require it to authenticate incoming requests. This is acceptable because, within the context of network isolation, the implementation of authentication and authorization processes for internal traffic may be considered costly and redundant.

While such approach can be justified for the context of network isolation, it relies upon that environmental condition (e.g., network isolation) being true. In other words, a software component itself depends on external factors to be secure, such as where it is located in the network. If that factor changes, the same software component may become vulnerable. For example, if a software component that relies on an isolated network for maintaining data integrity is later deployed in a non-isolated network (e.g., a network with many other components or with public access), the environmental condition is no longer true and the software component may now be vulnerable.

This problem is exacerbated in cloud environments and with contemporary fast-paced software delivery cycles. Software components are often built as read-to-deploy packages, such as Linux containers, and can be easily moved between hosting environments. Infrastructure changes may happen more quickly, and human operators may create new environments with a press of a button. There is a reduced effort to make environmental changes when deploying components, and software components are independent from the environment. Both of these factors make it more difficult to maintain various environmental conditions that may be needed for the data integrity of different software components and the environment as a whole.

The present disclosure describes solutions to the above-described problems.

BRIEF SUMMARY

The present disclosure relates generally to attaching environmental condition information to a software component so that the environmental conditions can be automatically verified when the software component is deployed. As a result, environmental conditions can be established when a software component is initially developed by the operators who may be best-suited to determine appropriate environmental conditions. Further, environmental condition enforcement can be performed automatically at the time of deployment, without human intervention. For example, when the software component is about to deployed, a deployment system can automatically examine the information about the deployment environment to verify that deployment environment satisfies the encoded environmental conditions.

The environmental conditions can be encoded during the software component development phase and packaged together with the software component. As such, the environmental conditions can co-exist with the software component and therefore can be subject to the same deployment schedules and approval processes as the software component.

In certain embodiments, a method comprises receiving, by a developer system, one or more environmental conditions to be associated with a software component; encoding, by the developer system, the one or more environmental conditions; and associating, by the developer system, the encoded one or more environmental conditions with the software component such that, at a later time when a deployment system is deploying a software package containing the software component at a target environment, the deployment system has access to the encoded one or more environmental conditions, and wherein upon deployment of the software package at the target environment, one or more properties of the target environment are checked to determine whether the one or more properties of the target environment satisfy the encoded one or more environmental conditions.

In yet another embodiment, wherein associating the encoded one or more environmental conditions with the software component includes: generating the software package, where the software package includes particular software component and the encoded one or more environmental conditions, and the method further comprising: providing the software package to at least one of the deployment system and a repository.

In yet another embodiment, wherein the encoded one or more environmental conditions are included in the software package in the form of metadata, within a manifest file, or within a specific environmental conditions file.

In yet another embodiment, wherein associating the encoded one or more environmental conditions with the software component includes: generating the software package, where the software package includes the software component, and further comprising: providing the software package to at least one of the deployment system and a repository; and providing the encoded one or more environmental conditions and information about the software package to the repository, where the encoded one or more environmental conditions are stored at the repository along with an indication that the encoded one or more environmental conditions are associated with the software package.

In yet another embodiment, wherein the encoding the one or more environmental conditions includes creating multiple encoded forms of the one or more environmental conditions, each of the multiple encoded forms being suited to a different programming language or environment.

In certain embodiments, a method comprises receiving, by a condition checker system, information about a software package containing a software component that is to be deployed at a target environment or that has been deployed at the target environment; identifying, by the condition checker system, a set of one or more environmental conditions associated with the software package; querying, by the condition checker system, the target environment for one or more current values of one or more properties as specified by the set of one or more environmental conditions to determine whether the set of one or more environmental conditions are satisfied by the target environment; and generating, by the condition checker system, a report indicative of results of the querying.

In yet another embodiment, wherein the set of one or more environmental conditions are included in the software package, and wherein identifying the set of one or more environmental conditions associated with the software package includes retrieving the set of one or more environmental conditions from the software package.

In yet another embodiment, wherein the set of one or more environmental conditions are stored in a repository as associated the software package, and wherein identifying the set of one or more environmental conditions associated with the software package includes communicating with the repository to retrieve the set of one or more environmental conditions based on the software package.

In yet another embodiment, wherein the report indicates that the at least one of the set of one or more environmental conditions are not satisfied by the target environment, and wherein one or more actions are performed based on the report.

In yet another embodiment, wherein the one or more actions include at least one of stopping deployment of the software package, deactivating the software component, and generating a warning signal.

The foregoing, together with other features and embodiments will become more apparent upon referring to the following specification, claims, and accompanying drawings.

BRIEF DESCRIPTION OF THE DRAWINGS

FIG. 4 depicts a simplified flowchart depicting another process for associating one or more environmental conditions with a particular software component, according to certain embodiments.

FIG. 6 depicts a simplified flowchart depicting a process for verifying whether one or more environmental conditions associated with a particular software component are satisfied by a target environment in which the software component is already deployed, according to certain embodiments.

DETAILED DESCRIPTION

Figure 1:
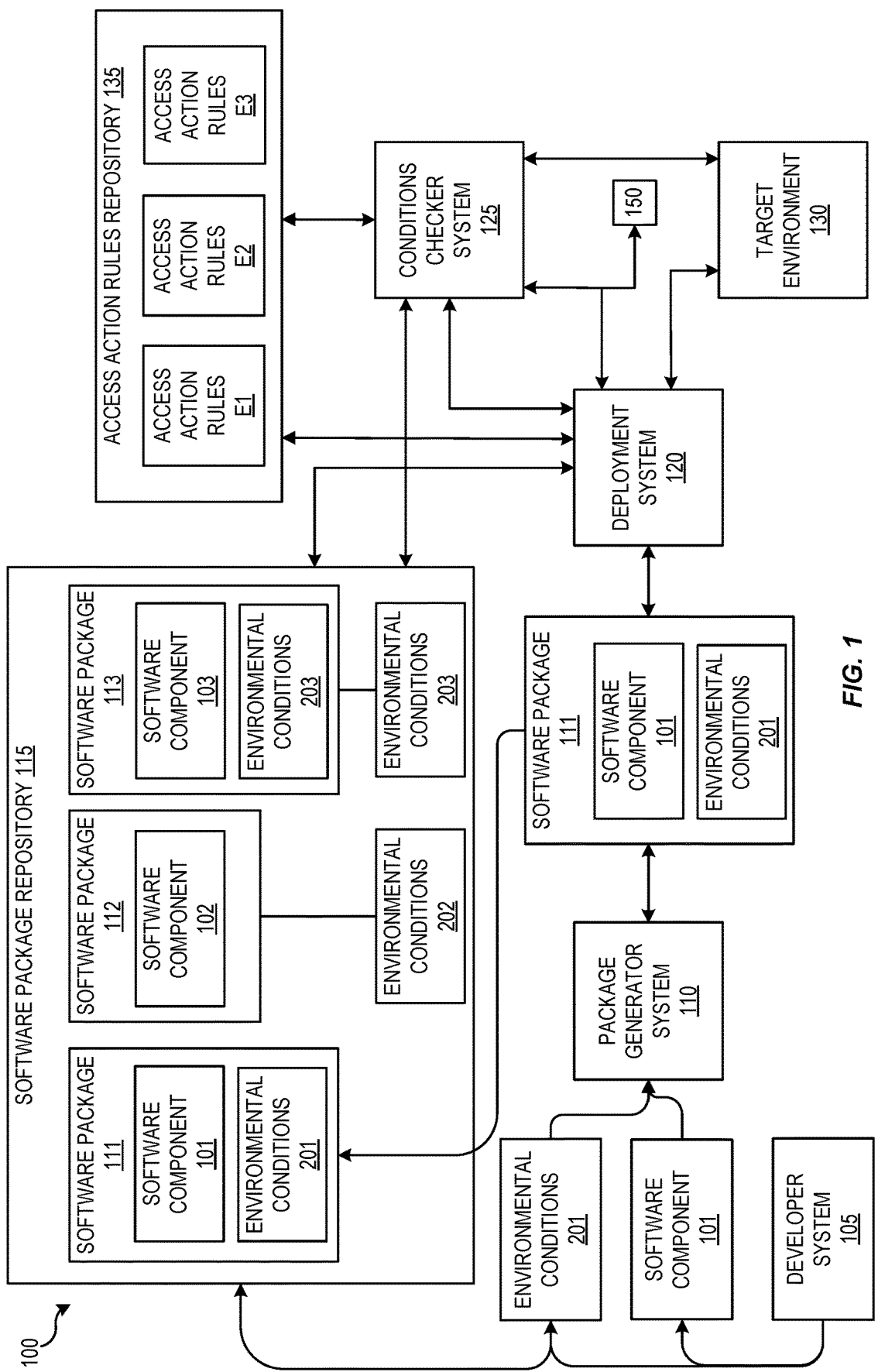
FIG. 1 is a simplified block diagram of a condition enforcement system according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to attaching environmental condition information to a software component so that the environmental conditions can be automatically verified when the software component is deployed. As a result, environmental conditions can be established when a software component is initially developed by the operators who may be best-suited to determine appropriate environmental conditions. Further, environmental condition enforcement can be performed automatically at the time of deployment, without human intervention. For example, when the software component is about to deployed, a deployment system can automatically examine the information about the deployment environment to verify that deployment environment satisfies the encoded environmental conditions.

The environmental conditions can be encoded during the software component development phase and packaged together with the software component. As such, the environmental conditions can co-exist with the software component and therefore can be subject to the same deployment schedules and approval processes as the software component.

In cloud environments, specific components may be incorporated into various contexts. In some situations, certain parameters should be changed or updated for different contexts in order to maintain secure systems. Responsibility for ensuring that systems are secure is often placed on external environments. For example, software development teams often rely on external environments to have specific configurations for achieving security goals.

In one example, a software development team develops an internal component that receives calls from another internal component in the same isolated network of a cloud environment. With both components being located in the same isolated network, it may be acceptable to implement the component that receives the call in a manner that does not require it to authenticate incoming requests. This is acceptable because, within the context of network isolation, the implementation of authentication and authorization processes for internal traffic may be considered costly and redundant.

While such approach can be justified for the context of network isolation, it relies upon that environmental condition (e.g., network isolation) being true. In other words, a software component itself depends on external factors to be secure, such as where it is located in the network. If that factor changes, the same software component may become vulnerable. For example, if a software component that relies on an isolated network for maintaining data integrity and access control is later deployed in a non-isolated network (e.g., a network with many other components or with public access), the environmental condition is no longer true and the software component may now be vulnerable.

This problem is exacerbated in cloud environments and with contemporary fast-paced software delivery cycles. Software components are often built as read-to-deploy packages, such as Linux containers, and can be easily moved between hosting environments. Infrastructure changes may happen more quickly, and human operators may create new environments with a press of a button. There is a reduced effort to make environmental changes when deploying components, and software components are independent from the environment. Both of these factors make it more difficult to maintain various environmental conditions that may be needed for the data integrity and access control of different software components and the environment or system as a whole.

One option for addressing this problem is to minimize and avoid environmental conditions for software components. For example, developers can choose to avoid creating internal endpoints that do not require authentication. In this case, even if a software component is exposed to a broader set of callers, it will not be immediately exposed, as authentication may be required for all callers. While this addresses the problem, in most scenarios this approach is not feasible (e.g., software components may be developed by other organizations) or cost effective.

Another approach is to ensure that environmental conditions are documented and preserved over time. For example, information can be documented (e.g., in a Wiki page) for a software component. The documentation can include information about how to deploy the software component, security considerations for the software component, and any other suitable information. The security considerations can include a section explaining environmental conditions, such as an indication that the software component should be deployed in a trusted network zone. As a result, personnel deploying the software component can refer to the documentation, identify the security considerations, and adhere to any indicated environmental conditions. While this approach can in theory address the problem, it is possible for environmental conditions to be missed or ignored, making this solution that is less stable and less scalable. As mentioned above, in contemporary software delivery models, the development of a software component and the deployment of the software component typically happen at different times and are performed by different entities and/or operators. As a result, the second entity that is deploying the software component may not be familiar with the software component's document or may not take the documentation into consideration.

Embodiments provide a solution of deploying a software component into the correct environmental conditions in manner that is more stable and scalable. Environmental conditions can be encoded within (or otherwise attached to) software components themselves. The environmental conditions can include any suitable information about expected or required properties of the target system or target environment in which the software component is being deployed. With the environmental conditions attached to the software components themselves, the encoded environmental conditions can thereby by automatically verified when it is time to deploy the software component. As a result, decisions about appropriate environmental conditions for the software component can be made during development of the software component by a developer who is likely to make the most-informed decision. Also, enforcement can be executed automatically, without required human intervention at the time of deployment from personnel deploying the software component. In effect, responsibility for knowing the environmental conditions and enforcing the environmental conditions is taken away from personnel deploying the software component, which thereby removes the risk that the environmental conditions will not be met. The responsibility is given to the developer (e.g., the person who creates the software component). This beneficial change in responsibility is sometimes referred to as "shifting left."

The disclosure herein primarily uses the example of deploying a software component in a private network. However, embodiments apply to other contexts and scenarios, such as deploying any other property of a cloud environment with any other suitable type of environmental condition. Other properties include bare metal machines, etc. Other environmental conditions include any suitable configuration or characteristic of cloud environment that is programmatically accessible.

FIG. 1 is a simplified block diagram of a condition enforcement system 100 according to some embodiments. The condition enforcement system 100 may comprise multiple computer systems communicatively coupled to each other via one or more communication links over one or more communication networks. The condition enforcement system 100 shown in FIG. 1 includes a developer system 105, a package generator system 110, a data package repository 115, a deployment system 120, a conditions checker system 125, an access action rules repository 135, and a target environment 130.

The condition enforcement system 100 depicted in FIG. 1 is merely an example and is not intended to unduly limit the scope of claimed embodiments. Many variations, alternatives, and modifications are possible. For example, in some implementations, the condition enforcement system 100 may have more or fewer computer systems or components than those shown in FIG. 1, or may have a different configuration or arrangement of computer systems and communication lines.

The various components depicted in FIG. 1 may be implemented using one or more computer systems. An example computer system may comprise compute resources (e.g., one or more processors or CPUs), memory resources (e.g., system memory, non-volatile memory), and networking resources (e.g., network interface cards (NICs)). A computer system may use the networking resources to communicate with one or more other computer systems over one or more communication networks. The communication networks may include, for example, the Internet, an intranet, an extranet, a Local Area Network (LAN), a Wide Area Network (WAN), and other networks facilitating communications, and combinations thereof. The communications may occur over wired or wireless links using one or more wired or wireless communication protocols. In certain implementations, the communication network may include a physical substrate network provided by an IaaS provider.

In certain implementations, the various components depicted in FIG. 1 may be hosted by infrastructure provided by a cloud service provider (CSP), such as an Infrastructure-as-a-Service (IaaS) provider. In an IaaS model, the CSP provides infrastructure (referred to as cloud services provider infrastructure or CSPI) that can be used by customers to build their own customizable private networks referred to a virtual cloud networks (VCNs). Customers can deploy one or more customer resources or workloads, such as compute instances, on these VCNs. A compute instance can be a virtual machine or a bare metal instance. A virtual machine (VM) compute instance may be an independent virtualized machine that runs on a physical bare metal computer system. Virtualization technologies, such as a hypervisor, makes it possible to run multiple virtual machine compute instances on the same physical computer system (also referred to as a host machine). A bare metal compute instance is hosted by a bare metal server or host machine without a hypervisor. When a bare metal compute instance is provisioned, a single customer or tenant maintains control of the physical CPU, memory, and network interfaces of the computer system hosting the bare metal instance and the computer system is not shared with other customers or tenants.

A software developer can operate the developer system 105 to build, generate, or otherwise develop software components, such as applications. While multiple different software components can be produced, the software component 101 is illustrated in FIG. 1.

Certain software components may be configured for usage in certain environments with certain property values. Embodiments provide systems and processes that allow the developer system 105 (or a separate reviewer system operated by a reviewer) to determine what environmental conditions 201 are suitable for the software component 101, so that the environmental conditions 201 can become associated with the software component 101 and enforced at any given target environment (e.g., the target environment 130) upon deployment of the software component 101 in that target environment.

The process can be separated into three main parts. First, defining and/or encoding the environmental conditions 201. Second, associating the environmental conditions 201 with the software component 101. Third, enforcing compliance with the environmental conditions 201 when the software component 101 is deployed.

Encoding Environmental Conditions

Embodiments provide a mechanism for defining and encoding environmental conditions. As mentioned above, environmental conditions 201 include expected properties of an environment in which the software component 101 will be located and/or operating. After the environmental conditions 201 are defined and encoded, they can be associated with the software component 101 and then verified in context of a target environment 130 where the software component 101 is being deployed.

An environmental condition can be satisfied by a certain value for a certain property at the target environment 130. For example, an environmental condition may specify that an application should be running in a private subnet. This type of environmental condition refers to a specific property (e.g., public or private) of a specific resource (e.g., the network subnet) of a specific cloud service (e.g., virtual networking).

According to embodiments, cloud services allow accessing resources and properties in a structured manner on a defined interface with defined properties and values. An access layer can allow properties to be accessed and/or modified. For example, an API can be used to manipulate a JSON (JavaScript Object Notation) structure. As a result, an environmental condition may be defined by referring to the relevant properties of relevant cloud resources and giving their expected value. Also, the condition checker system 125 can lookup certain specified cloud service properties, and then determine whether those properties satisfy a given environmental condition.

For example, a certain network subnet could be defined as follows:

```
{
  id: 617364662e38
  compartmentId: 627564612e37
  public: false
  lastModified: 5-Oct-2021 11:37:23
}
```

This identifies a resource (the subnet), gives its compartment location, and gives a property value (e.g., public=false). An environmental condition can refer to this property, or any other suitable property (e.g., private keys, load balance, etc.).

A desired environmental condition may be that the software component 101 should be located in a private subnet. This can be achieved expressed by referring to the network subnet and/or specifying an expected value. For example, the environmental condition can be defined as follows:

```
{
  host:
    subnet: {
      public: false
    }
}
```

In this example, the environmental condition specifies that, for any host on which the software component runs, that host must be located within a subnet that has a value of "false" for the property referred to as "public."

As shown above, an environmental condition may be encoded in a specific language, format, or other way of expressing a condition.

According to embodiments, the same environmental condition may be encoded in multiple ways that correspond to different target environments (e.g., different cloud providers). For example, different cloud providers may define their resources and their properties in different manners, use different programming languages, or otherwise express and access resources different ways. If a certain property is encoded differently, an environmental condition that refers to that property may also need to be encoded differently.

In some embodiments, the developer system 105 may encode environmental conditions 201 in a manner that relates to structures, language, APIs, etc. used by a particular cloud vendor. This however means that the encoding will be only valid for that cloud vendor. Accordingly, in some embodiments, the developer system 105 may encode the same environmental condition into multiple different forms, each form corresponding to a certain cloud vendor or structure. As a result, when the software component 101 is deployed, the correct encoding of the environmental condition can be selected and used for verification (e.g., by the conditions checker system 125) based on the specific cloud vendor or structure in which the software component 101 is being deployed.

In some embodiments, environmental conditions 201 can be encoded in a manner that is generalized for use with target environments (e.g., different cloud vendors and cloud structures). For example, the developer system 105 can define a standard set of services, resources and properties that are valid across multiple cloud providers, and that may relate to various potential environmental conditions. These can be expressed using a meta-language. Upon deployment of a software component 101, a specific environmental condition can be translated (e.g., by the deployment system 120 or the condition checker system 125) from the generalized encoded form (e.g., in the meta-language) to a vendor-specific encoded form, so that the encoded environmental condition can be used within the specific target environment 130 in which the software component is being deployed. For example, a translation system (e.g., at the deployment system 120 or the condition checker system 125) or mapping can be used to translate generalized encodings to vendor-specific encodings.

Embodiments allow environmental conditions 201 to be encoded using any suitable combination of the above-described techniques. For example, the same environmental condition can be encoded in one or more vendor-specific formats, and/or in a generalized meta-language format.

In another embodiment, environmental conditions 201 can be encoded using a pre-existing specification provided by a particular cloud orchestration tool, such as Terraform. An advantage of this approach is simplicity for engineers who can encode their infrastructure as well as environmental conditions in the same form.

After the developer system 105 creates the software component 101 and/or the environmental conditions 201 for the software component 101, the next task is to create a lasting association between the software component 101 and the environmental conditions 201 so that the environmental conditions 201 can be consulted later on, whenever and wherever the software component 101 is being deployed.

Associating Environmental Conditions with Software Component

According to embodiments, a set of one or more environmental conditions 201 can be associated with a software component 101. Embodiments provide multiple ways to make the environmental conditions 201 available when the software component 101 is being deployed. As a result, even after a software package with the software component 101 is transmitted and shared into different contexts, the environmental conditions 201 remain present and/or readily available for use during verification later on when the software component 101 is being deployed.

In some embodiments, a set of one or more environmental conditions 201 can be associated with a software component 101 by embedding the set of one or more environmental conditions 201 into a software package that includes the software component 101. As shown in FIG. 1, a package generator system 110 (which may be part of a software delivery platform) can build a software package 111 that includes both the software component 101 and the environmental conditions 201, as well as any other suitable information.

An example of a software component 101 is an application, and an example of a software package 111 is a container. One or more encodings of the environmental conditions 201 can be included in the software package 111. The encoding of the environmental conditions 201 may not be a part of the software component 101 itself, but instead is included as a separate item in a software package 111 used to deliver the software component 101. In addition to the software component 101, the software package 111 can also include other information and tools related to the software component 101, such as libraries, configuration and resources. An example of such packaging is a Linux container images.

Embodiments allow the environmental conditions 201 to be included in the software package 111 in one or more ways. For example, the encoded environmental conditions 201 can be provided within a package manifest file of the software package 111, as a separate file within the software package 111, and/or as metadata of the software package 111. In the example of a file, one or more encodings of one or more environmental conditions 201 can be embedded as a file with a predefined filename and/or a file in a predefined location of the software package 111. Environmental conditions 201 can also be provided as package metadata or another package label. In some embodiments, environmental conditions 201 can be embedded at higher-level packages. As an example, Helm Charts provide packaging capability for applications deployed on Kubernetes that may include multiple containers and other resources such as configuration objects, secrets, volume definitions and so forth.

Accordingly, environmental conditions 201 (e.g., encodings of defined environmental conditions) can be include in or otherwise attached to a software package 111. As a result, when the software package 111 is transmitted and shared, the environmental conditions 201 are also transmitted and shared. Any system in possession of the software package 111 that may deploy the software package 111 will also be in possession of the environmental conditions 201 and therefore able to verify that they are enforced. Thus, directly embedding environmental conditions 201 within a software package has a clear benefit of ensuring that the environmental conditions 201 information is always available and moves with the software package 111 itself.

A software package 111 can include one software component 101, or multiple software components, according to embodiments. Additionally, each software component in the software package 111 can be accompanied by one or more encoded environmental conditions 201. For example, each software component can be associated with a distinct manifest file (e.g., a semi-structured file like a JSON file) detailing one or more environmental conditions. A software package 111 that includes multiple software components can also include multiple manifests of environmental conditions, each manifest corresponding to a specific software component. In some embodiments, one manifest of environmental conditions can apply to each software component in the software package 111.

The package generator system 110 and/or developer system 105 can distribute the software package 111 to one or more other systems. For example, the software package 111 can be provided to and stored in a software package repository 115. The software package repository 115 may make the software package 111 available and retrievable by other systems, such as the deployment system 120. Additionally or alternatively, the package generator system 110 and/or developer system 105 can provide the software package 111 directly to the deployment system 120.

As shown in FIG. 1, the software package repository 115 can store any suitable number of software packages, such as, but not limited to, the first software package 111, a second software package 112, and a third software package 113. Also as shown, different software components may be associated with corresponding environmental conditions in different manners. For example, as discussed above, the first software package 111 may incorporate the environmental conditions 201 within the package. In contrast, the second software package 112 may include a software component 102 but not the associated environmental conditions 202. However, the environmental conditions 201 can be stored separately in the software package repository 115 along with an indication that the environmental conditions 202 are linked or otherwise associated with the second software package 112. As a third example, the third software package 113 may have the environmental conditions 203 that are stored in both manners. The third software package 113 may include a third software component 103 along with the associated environmental conditions 203, similar to the first software package 111. Additionally, the environmental conditions 203 can also be stored separately from the third software package 113 at the software package repository 115, and there may be an indication that the environmental conditions 203 are linked or otherwise associated with the third software package 113, similar to the second software package 112.

Accordingly, in some embodiments, in addition to or instead of embedding the environmental conditions 201 into the software package 111, the developer system 105 can create an association between environmental conditions 201 and the software component 101 by providing the environmental conditions 201 to the software package repository 115 on their own (e.g., outside of the software package 111). In some embodiments, the developer system 105 may provide the environmental conditions 201 to the software package repository 115 when the software component 101 is initially developed and the environmental conditions 201 are initially determined. As discussed above, one or more encoded versions of the environmental conditions 201 can be created and submitted to the software package repository 115. The developer system 105 may provide environmental conditions 201 directly to the software package repository 115 along with information about the software component 101 and/or software package 111 with which the environmental conditions 201 are associated. Additionally, in this case, the software package 111 that is created by the package generator system 110 and provided to the software package repository 115 may not include the environmental conditions 201.

As shown in FIG. 1, the software package repository 115 can store both software packages and separated sets of environmental conditions. In other embodiments, isolated sets of environmental conditions can be stored in another repository that is separate from the software package repository 115.

The software package repository 115 can have a known location and can be accessible so that, when a software package is being deployed, the deployment system 120 can access the software package repository 115 and retrieve the software package 111 and/or information about the environmental conditions 201 for that software package 111. Embodiments allow the repository to be either publicly accessible or private.

In embodiments where the environmental conditions 201 can be stored separately from the software package 111, there is the option of creating environmental conditions 201 after the software package 111 is distributed and/or creating environmental conditions 201 independently form the software developer. For example, if the original software developer does not make sure to embed the environmental conditions 201 in the software package 111, if it is desired to add new environmental conditions 201 (e.g., require a load balancer), and/or if specialized environmental conditions 201 are desired for a specific target environment 130 (e.g., a government customer may desire deployment on trusted machines), infrastructure, or usage, such environmental conditions 201 can be created and added to the repository at any suitable time.

Additionally, a repository allows environmental conditions 201 to be defined for and associated with a group of software components (e.g., components of particular type or components from a certain vendor), as opposed to attaching them to each software component individually. For example, for a certain vendor, there may be an environmental condition that all software components from the vendor should be deployed on a trusted system. This can improve the efficiency of verifying a group of software components being deployed together.

Enforcing Environmental Conditions Upon Deployment

When a software package is deployed for usage in a certain target environment 130 (e.g., a system or network), it can be verified that the property values of that target environment 130 satisfy the environmental conditions, and the environmental conditions can otherwise be enforced.

For example, when the software package 101 is about to be deployed by the deployment system 120 into a specific target environment 130, or is already deployed, the deployment system 120 can cause the conditions checker system 125 to verify whether the property values of that target environment 130 satisfy the environmental conditions 201. The conditions checker system 125 can locate any associated environmental conditions 201 (e.g., embedded in the software package 111 and/or located in a repository). Then, the conditions checker system 125 can determine which properties and corresponding property values are specified by the environmental conditions 201. The conditions checker system 125 can also access information about the target environment 130 (e.g., via API), and determine the currently configured states or values of the specific properties that are called out by the environmental conditions 201. Then, the conditions checker system 125 can compare the actual states or values of the properties with the expected state of those properties as indicated in the environmental conditions 201. The conditions checker system 125 can generate a report indicating whether the environmental conditions 201 are satisfied, and provide the report to the deployment system 120 or any other suitable system (as shown by box 150 in FIG. 1). If there is a match and the environmental conditions 201 are satisfied, deployment can continue and/or the deployed software can continue operating normally. If there is not a match and the environmental conditions 201 are not satisfied, deployment can be halted and/or the software component 101 may be deactivated. Alternatively, the deployment can continue, but a warning alert may be triggered and/or delivered to the appropriate monitoring systems and/or personnel. Action may be taken to re-configure the indicated properties at the target environment 130 such that the environmental conditions 201 become satisfied.

In some embodiments, the environmental conditions 201 are checked and verified before the deployment, and the deployment is prevented if the environmental conditions 201 are not satisfied. The checking and verification process involves accessing the environmental conditions 201 associated with the software component 101, and communicating with a target environment 130 (e.g., a destination cloud control plane where the software package 111 is being deployed) to identify current states of the target environment. For example, in the example of an environmental condition that requires deployment only within a private subnet, the conditions checker system 125 communicates with the cloud control plane of a virtual networking service, and fetches information about the network in which the software package 111 is about to be deployed and located. The conditions checker system 125 then verifies that the subnet is indeed private. This part of the deployment may be operated as part of or in conjunction with a deployment automation system (e.g., the deployment system 120), as such a system is likely to already have access to the cloud control plane and information about how to reference properties of that target environment 130.

While the deployment system 120 and/or conditions checker system 125 may perform the verification, embodiments provide other alternative solutions. For example, a cloud provider may offer a centralized environmental condition verification service or an organization may use a single centrally located deployment component. In other words, verification can be performed by a local deployment system or a separate deployment orchestration tool (e.g., Terraform, CI/CD pipeline, Natural, etc.).

As mentioned above, a part of verification involves accessing the target environment 130 to determine certain values of certain properties in the target environment 130. Various mechanisms can be utilized to obtain information about a target environment 130. For example, direct communication with a cloud control plane can be used to obtain information about property values. Additionally, in some situations, a local state of the target environment 130 may be available. For example, a Terraform deployment orchestration tool may have a local state that could be examined to verify a cloud environment status.

As mentioned above, in some embodiment the checking and verification can be performed before the deployment occurs, as this allows deployment to be preventing if a target environment 130 does not satisfy one or more environmental conditions 201. Verification can take place for a group of software packages before any of them are deployed. This allows deployment to take place for a group of software packages together with assurance that no individual software packages will fail to deploy (e.g., due to one specific software package failing verification in the middle of iterative group deployment). Group verification can take place at the same time as checking for other possible system vulnerabilities.

In other embodiments, verification can be done after deployment is completed. For example, verification can be performed regularly, on a periodic or ongoing basis. In this case, unexpected changes to the target environment 130 that may violate one or more environmental conditions 201 can be also identified. Also, this can be useful in situations where it is desired to deploy even if verification fails, as discussed in more detail below.

In some embodiments, if verification fails, deployment can be stopped. Optionally, attempts can be made to modify the targeted property so that environmental conditions 201 become satisfied, and then deployment can be attempted again.

In other embodiments, deployment can continue even if one or more environmental conditions 201 are not satisfied. If deployment continues, the system can still react to a failed verification by generating an alert.

Policies for how to react in the case of failed verification can vary for different environmental conditions. For example, a system administrator may be able to choose a preferred reaction for a failed verification. Also, reactions can vary for different target environments, different software packages, and/or different properties. For example, an administrator may decide to prevent deployment if a first type of environmental condition is not satisfied (e.g., the network privacy setting is wrong), but allow deployment if one or more other types of environmental conditions is not satisfied and instead of blocking deployment the reaction may be to generate an alert. As another example, a certain system (e.g., a government system) may be considered critical, and data integrity and access control standards may be valued more highly than availability and continuous operation. In such a case, failed verifications may result in deployment being paused or rejected, or the entire system may shut down. If an environmental condition is considered critical enough to cause deployment to stop, that environmental condition may be considered a prerequisite for deployment. Stopping deployment is one way of enforcing the environmental conditions. In a further example, availability and continued operation of a certain system (e.g., a commercial system) may be prioritized over data integrity and access control. In this case, failed verification may not trigger a stop to deployment, but may instead trigger a warning. Human operators may receive the warning and react as needed (e.g., modify the property of concern when possible).

In some embodiments, reaction policies may be configured by an owner of the system in which deployment is taking place, as opposed to being configured by a developer of the software component. The system owner or administrator may be in a better position to consider system-specific concerns, priorities, and needs. As a result, different verification-failure reactions can happen for the same software component across different contexts and environments. In other embodiments, a developer may also or alternatively be able to configure verification-failure reaction policies for certain software components.

As shown in FIG. 1, an access action rules repository 135 can store information about policies and rules for failed verifications. Different sets of access rules can stored for different target environments. A first set of access action rules E1 can be associated with a first target environment (e.g., the target environment 130). A first set of access rules E1 can be associated with a first target environment (e.g., the target environment 130). A second set of access action rules E2 can be associated with a second target environment. A third set of access action rules E3 can be associated with a third target environment. The conditions checker system 125 and/or the deployment system 120 can communicate with the access action rules repository 135 to retrieve access rules for a specific target environment when needed.

Figure 2:
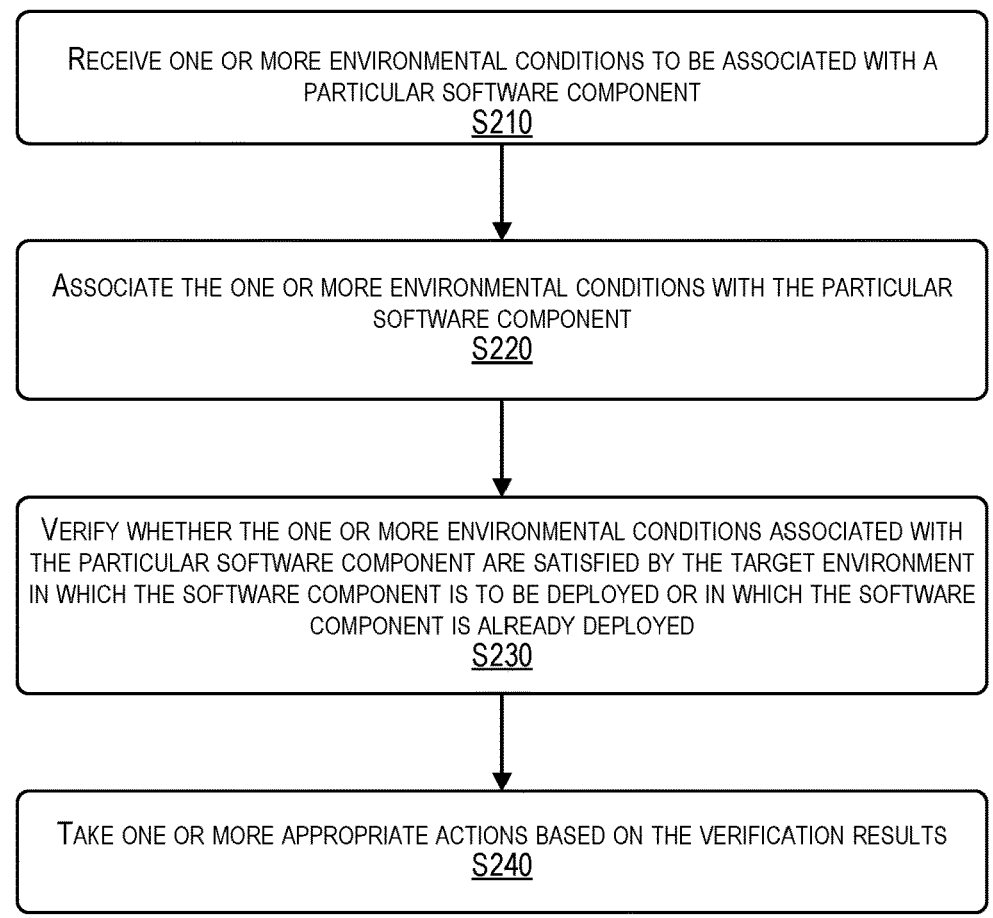
FIG. 2 depicts a simplified flowchart depicting a process for enforcing one or more environmental conditions at a target environment, according to certain embodiments.

FIG. 2 depicts a simplified flowchart 200 depicting a process for enforcing one or more environmental conditions at a target environment, according to certain embodiments. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel.

At S210, the developer system 105 may receive one or more environmental conditions to be associated with a particular software component. For example, the one or more environmental conditions may be provided by a software component developer or a software reviewer for a software component that is being developed. The one or more environmental conditions may be determined and provided in conjunction with developing the software component.

At S220, the developer system 105 and/or package generator system 110 may associate the one or more environmental conditions with the particular software component.

For example, any suitable linkage or indication can be created that the one or more environmental conditions are associated with the particular software component. In some embodiments, the package generator system 110 may generate a software package that includes the software component and the one or more environmental conditions. Additionally or instead, the developer system 105 may provide the one or more environmental conditions to a repository (e.g., a software package repository 115) where the one or more environmental conditions may be stored along with an indication that they correspond to a particular software package. Additional details regarding step S220 are given below with respect to FIG. 3 and FIG. 4.

At any suitable time, it may be determined to deploy the software package with the software component at the target environment 130. Before, during, or after deployment, properties of the target environment 130 may be checked to determine whether the target environment 130 satisfies the one or more environmental conditions. For example, at S230, the conditions checker system 125 may verify whether the one or more environmental conditions associated with the particular software component are satisfied by the target environment 130 in which the software component is to be deployed or in which the software component is already deployed. Additional details regarding step S230 are given below with respect to FIG. 5 and FIG. 6.

At S240, the conditions checker system 125, the deployment system 120, and/or any other suitable systems may take one or more appropriate actions based on the verification results. For example, the conditions checker system 125 may generate a report with verification results of whether the one or more environmental conditions are satisfied by the target environment 130, and the deployment system 120 may take an action (e.g., continue deployment, halt deployment, generate an alert) based on the report with the verification results. Additional details regarding step S240 are given below with respect to FIG. 7.

Figure 3:
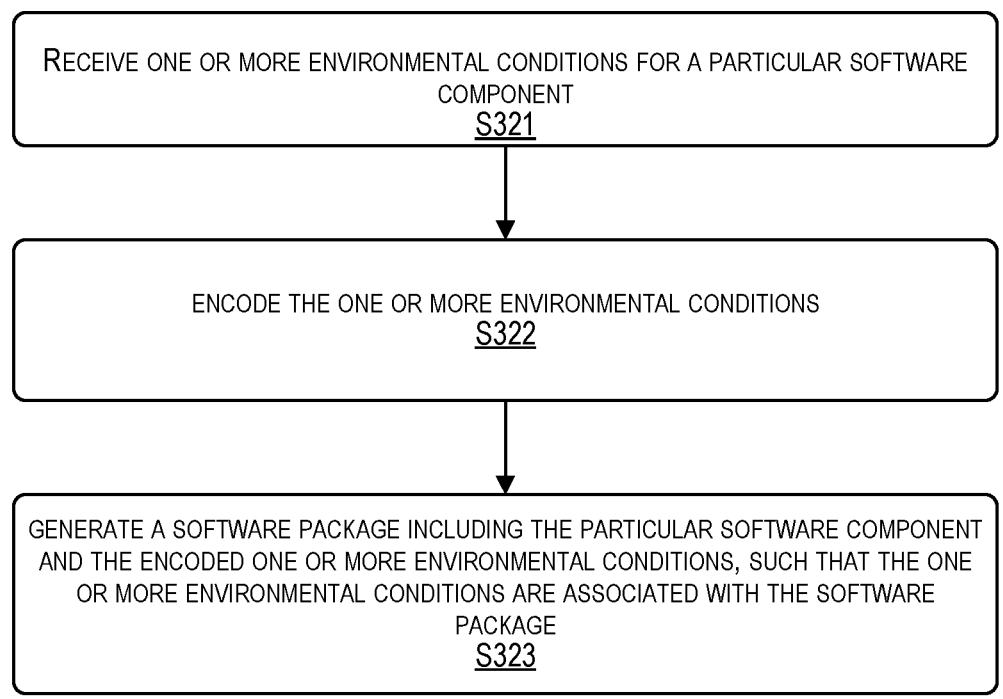
FIG. 3 depicts a simplified flowchart depicting a process for associating one or more environmental conditions with a particular software component, according to certain embodiments.

FIG. 3 depicts a simplified flowchart 300 depicting a process for associating one or more environmental conditions with a particular software component, according to certain embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel.

At S321, the developer system 105 may receive one or more environmental conditions for a particular software component. For example, the one or more environmental conditions may be provided by a software component developer or a software reviewer for a software component that is being developed. The one or more environmental conditions may be determined and provided in conjunction with developing the software component.

At S322, the developer system 105 may encode the one or more environmental conditions. For example, the one or more environmental conditions may be encoded into one or more forms that are suited for one or more programming languages, systems, or environments.

At S323, the developer system 105 and/or the package generator system 110 may generate a software package including the particular software component and the encoded one or more environmental conditions, such that the one or more environmental conditions are associated with the software package. The one or more environmental conditions can be included in the form of metadata, within a manifest file, in a dedicated file, or in any other suitable form.

FIG. 4 depicts a simplified flowchart 400 depicting another process for associating one or more environmental conditions with a particular software component, according to certain embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel.

At S421, the developer system 105 may receive one or more environmental conditions to be associated with a software package for a particular software component. The software package may or may not include the one or more environmental conditions.

At S422, the developer system 105 may store the one or more environmental conditions and create an association between the one or more environmental conditions and the software package. For example, the developer system 105 may provide the one or more environmental conditions to a repository (e.g., a software package repository 115) where the one or more environmental conditions may be stored along with an indication that they correspond to a particular software package. The one or more environmental conditions may be stored independently from the software package, and an indication may also be stored that the one or more environmental conditions are linked or otherwise associated with the software package. The one or more environmental conditions may be stored in the same repository as the software package. Alternatively, the software package may be stored in a first repository, the one or more environmental conditions may be stored in second repository, and an indication of the association between the one or more environmental conditions and the software package may be stored in one or both of the first repository and the second repository.

In some embodiments, the one or more environmental conditions can be stored within the software package (e.g., as described with respect to FIG. 3) as well as separate from the software package and in a repository (e.g., as described with respect to FIG. 4).

Figure 5:
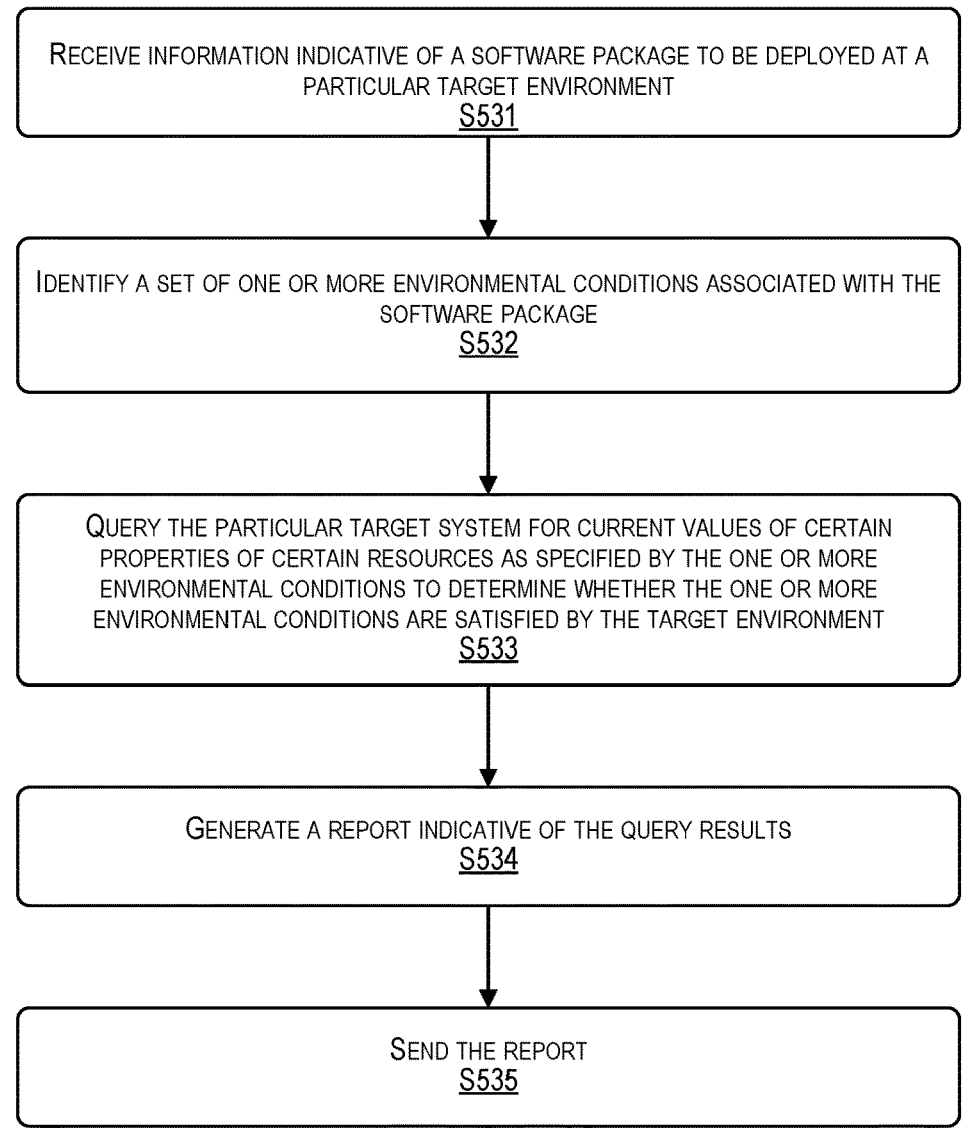
FIG. 5 depicts a simplified flowchart depicting a process for verifying whether one or more environmental conditions associated with a particular software component are satisfied by a target environment in which the software component is to be deployed, according to certain embodiments.

FIG. 5 depicts a simplified flowchart 500 depicting a process for verifying whether one or more environmental conditions associated with a particular software component are satisfied by a target environment in which the software component is to be deployed, according to certain embodiments. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel.

At S531, the condition checker system 125 may receive information indicative of a software package to be deployed at a particular target environment 130. For example, the deployment system 120 may determine to deploy the software package at the target environment 130, and may instruct the condition checker system 125 to determine whether the target environment 130 satisfies one or more environmental conditions associated with the software package.

At S532, the condition checker system 125 may identify a set of one or more environmental conditions associated with the software package. The condition checker system 125 may receive the one or more environmental conditions, the software package, information identifying the target environment 130, and/or any other suitable information. Information about the one or more environmental conditions may be provided by the deployment system 120 or retrieved from a repository (e.g. the software package repository 115) based on, for example, the software package (e.g., a software package identifier). The one or more environmental conditions may be obtained from within the software package, or received/retrieved separately form the software package. In some embodiments, the one or more environmental conditions may be encoded into multiple forms. The condition checker system 125 may identify a version (e.g., software programming language) of the encoded environmental conditions that is suited for the target environment 130. In some embodiments, the condition checker system 125 may translate (e.g., from an intermediate form) the encoded environmental conditions into a form that suits the target environment 130.

At S533, the condition checker system 125 may query the particular target environment 130 for current values of certain properties of certain resources as specified by the one or more environmental conditions to determine whether the one or more environmental conditions are satisfied by the target environment 130. For example, the one or more environmental conditions may specify that the target environment 130 should have a first specific value (e.g., private) for a first specific property (e.g., network privacy configuration) at a first specific resource (e.g., a specific subnet of the network) in the target environment 130. The condition checker system 125 may communicate (e.g., via an API) with the target environment 130 to determine the actual current value of the first specific property of the first specific resource at the target environment 130. The condition checker system 125 may then compare the actual current value of the first specific property with the indicated first specific value of the first specific property according to the environmental condition. The condition checker system 125 may determine whether the environmental condition is satisfied by the target environment 130 (e.g., does the actual current value of the first specific property match or otherwise satisfy the first specific value of the first specific property).

At S534, the condition checker system 125 may generate a report indicative of the query results. For example, the condition checker system 125 may generate a report detailing whether some, all, or none of the one or more environmental conditions are satisfied by the target environment 130. The report can one or more actual values of certain properties, one or more expected values of certain properties according to the one or more environmental conditions, and any other suitable information.

At S535, the condition checker system 125 may send the report to one or more external systems, such as the deployment system 120, the access action rules repository 135, and/or any other suitable systems (as indicated by box 150).

FIG. 6 depicts a simplified flowchart 600 depicting a process for verifying whether one or more environmental conditions associated with a particular software component are satisfied by a target environment in which the software component is already deployed, according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel.

At S631, the condition checker system 125 may receive information indicative of a software package that has been deployed at a particular target environment 130. For example, the deployment system 120 may have already deployed the software package at the target environment 130. An automatic process may be initiated (e.g., based on a certain recurring timeframe) or a system administrator may instruct the condition checker system 125 to determine whether the target environment 130 satisfies one or more environmental conditions associated with the software package.

At S632, the condition checker system 125 may identify a set of one or more environmental conditions associated with the software package. The condition checker system 125 may receive the one or more environmental conditions, the software package, information identifying the target environment 130, and/or any other suitable information. Information about the one or more environmental conditions may be provided by the deployment system 120 or retrieved from a repository (e.g. the software package repository 115) based on, for example, the software package (e.g., a software package identifier). In some embodiments, the one or more environmental conditions may be encoded into multiple forms. The condition checker system 125 may identify a version (e.g., software programming language) of the encoded environmental conditions that is suited for the target environment 130. In some embodiments, the condition checker system 125 may translate (e.g., from an intermediate form) the encoded environmental conditions into a form that suits the target environment 130.

At S633, the condition checker system 125 may query the particular target environment 130 for current values of certain properties of certain resources as specified by the one or more environmental conditions to determine whether the one or more environmental conditions are satisfied by the target environment 130. For example, the one or more environmental conditions may specify that the target environment 130 should have a first specific value (e.g., private) for a first specific property (e.g., network privacy configuration) at a first specific resource (e.g., a specific subnet of the network) in the target environment 130. The condition checker system 125 may communicate (e.g., via an API) with the target environment 130 to determine the actual current value of the first specific property of the first specific resource at the target environment 130. The condition checker system 125 may then compare the actual current value of the first specific property with the indicated first specific value of the first specific property according to the environmental condition. The condition checker system 125 may determine whether the environmental condition is satisfied by the target environment 130 (e.g., does the actual current value of the first specific property match or otherwise satisfy the first specific value of the first specific property).

At S634, the condition checker system 125 may generate a report indicative of the query results. For example, the condition checker system 125 may generate a report detailing whether some, all, or none of the one or more environmental conditions are satisfied by the target environment 130. The report can one or more actual values of certain properties, one or more expected values of certain properties according to the one or more environmental conditions, and any other suitable information.

At S635, the condition checker system 125 may send the report to one or more external systems, such as the deployment system 120, the access action rules repository 135, and/or any other suitable systems (as indicated by box 150). The condition checker system 125 may also or instead perform one or more actions based on the query results, such as deactivating the software component and/or activating a warning alert.

Figure 7:
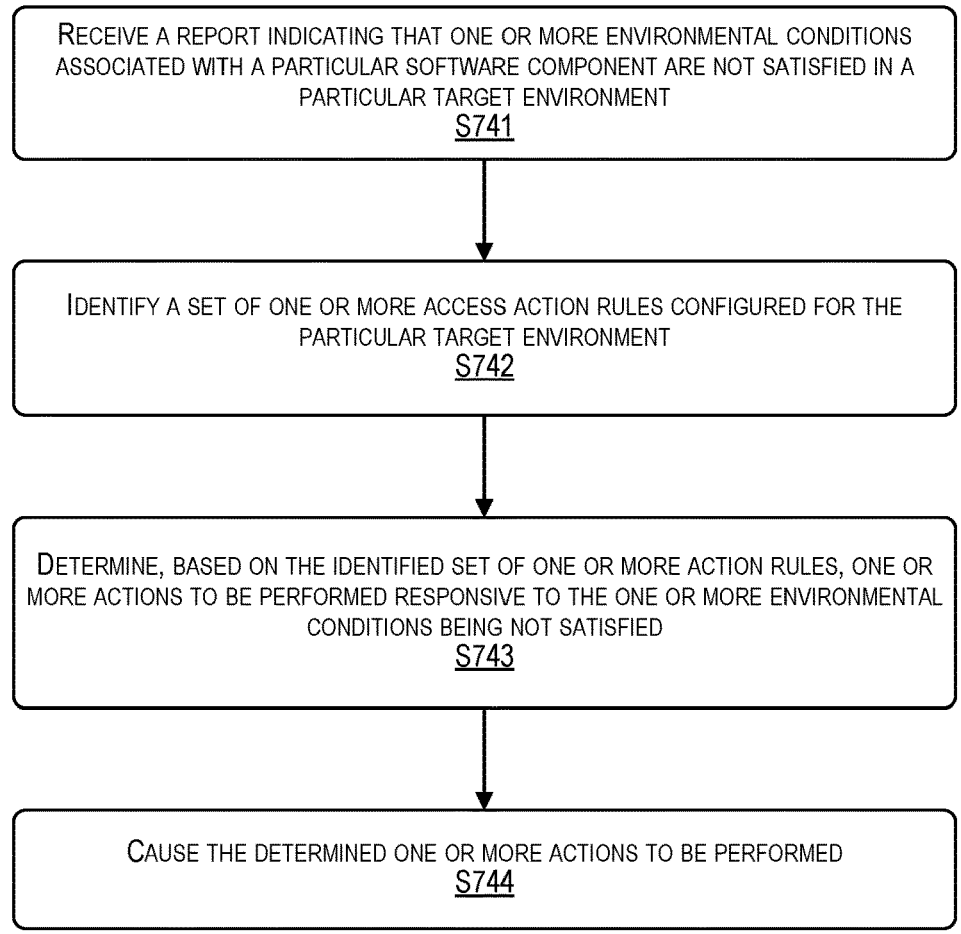
FIG. 7 depicts a simplified flowchart depicting a process for taking one or more appropriate actions based on verification results, according to certain embodiments.

FIG. 7 depicts a simplified flowchart 700 depicting a process for taking one or more appropriate actions based on verification results, according to certain embodiments. The processing depicted in FIG. 7 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the processing may be performed in some different order or some steps may also be performed in parallel.

At S741, the deployment system 120, a target environment administrator system, or any other suitable system, may receive a report indicating that one or more environmental conditions associated with a particular software component are not satisfied in a particular target environment 130. The report may be provided by the conditions checker system 125, as described above with respect to FIGS. 5-6.

At S742, the deployment system 120, a target environment administrator system, or any other suitable system, may identify a set of one or more access action rules configured for the particular target environment 130. For example, the deployment system 120 may obtain a set of one or more access action rules E1 from the access action rules repository 135. The access action rules E1 may be associated with and identified based on the target environment 130, the software package of concern, the environmental condition that is not satisfied, and/or any other suitable information.

At S743, the deployment system 120, a target environment administrator system, or any other suitable system, may determine, based on the identified set of one or more action rules, one or more actions to be performed responsive to the one or more environmental conditions being not satisfied. For example, the access action rules E1 may indicate that, in case of the one or more environmental conditions being not satisfied, the software package should not be deployed (e.g., stop deployment), an already-deployed software component should be deactivated or shut down, the software component should be paused, the resource (e.g., network, subnet, or host machine) should be deactivated or shut down, the entire target environment 130 should be deactivated or shut down, a warning message or other notification should be sent to an administrator personnel, the value of the property of the resource (as indicated by the environmental condition) should be automatically updated or changed, and/or any other suitable actions should be performed.

At S744, the deployment system 120, a target environment administrator system, or any other suitable system, may cause the determined one or more actions to be performed. For example, the deployment system 120 may perform the one or more actions, or may instruct an external system (e.g., an administrator system) to perform the one or more actions.

Embodiments of the invention advantageously shift-left responsibility for decisions about environmental security configurations from deployment systems and personnel to software developers. The developer can decide whether certain environmental conditions exist for a software component. As a result, the decisions can be made in context and with sufficient information about the software component (e.g., how it operates). Further, encoded information about environmental conditions can stay within the software component, regardless of how many steps removed the deployment system is from the developer system (e.g., how many times the software package is transferred), and regardless of whether or not the deployment system is in communication with the developer system. Also, embodiments enable automatic enforcement of environmental security configurations instead of relying on various personnel to enforce those configurations at a given target environment or target system.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
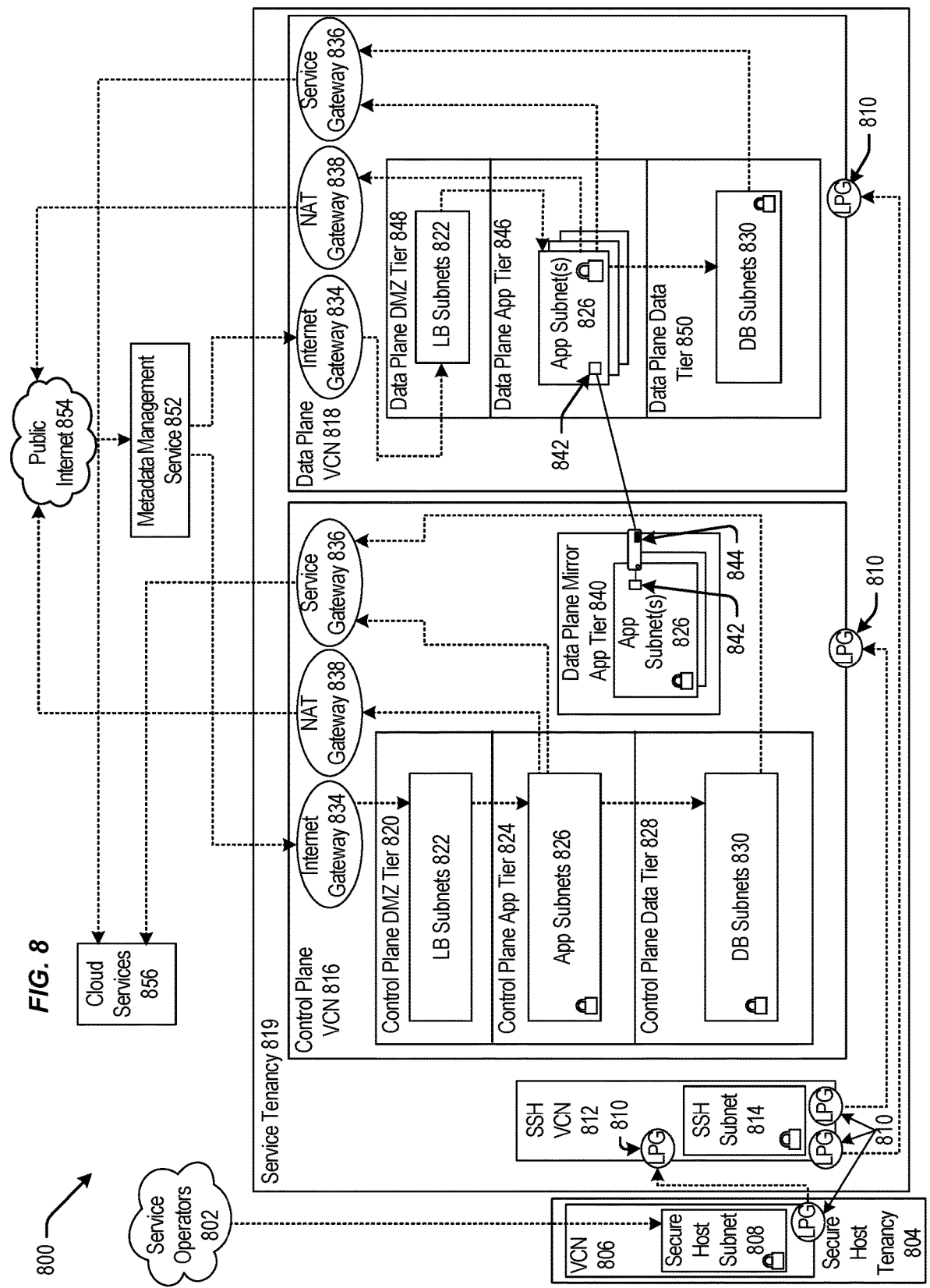
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
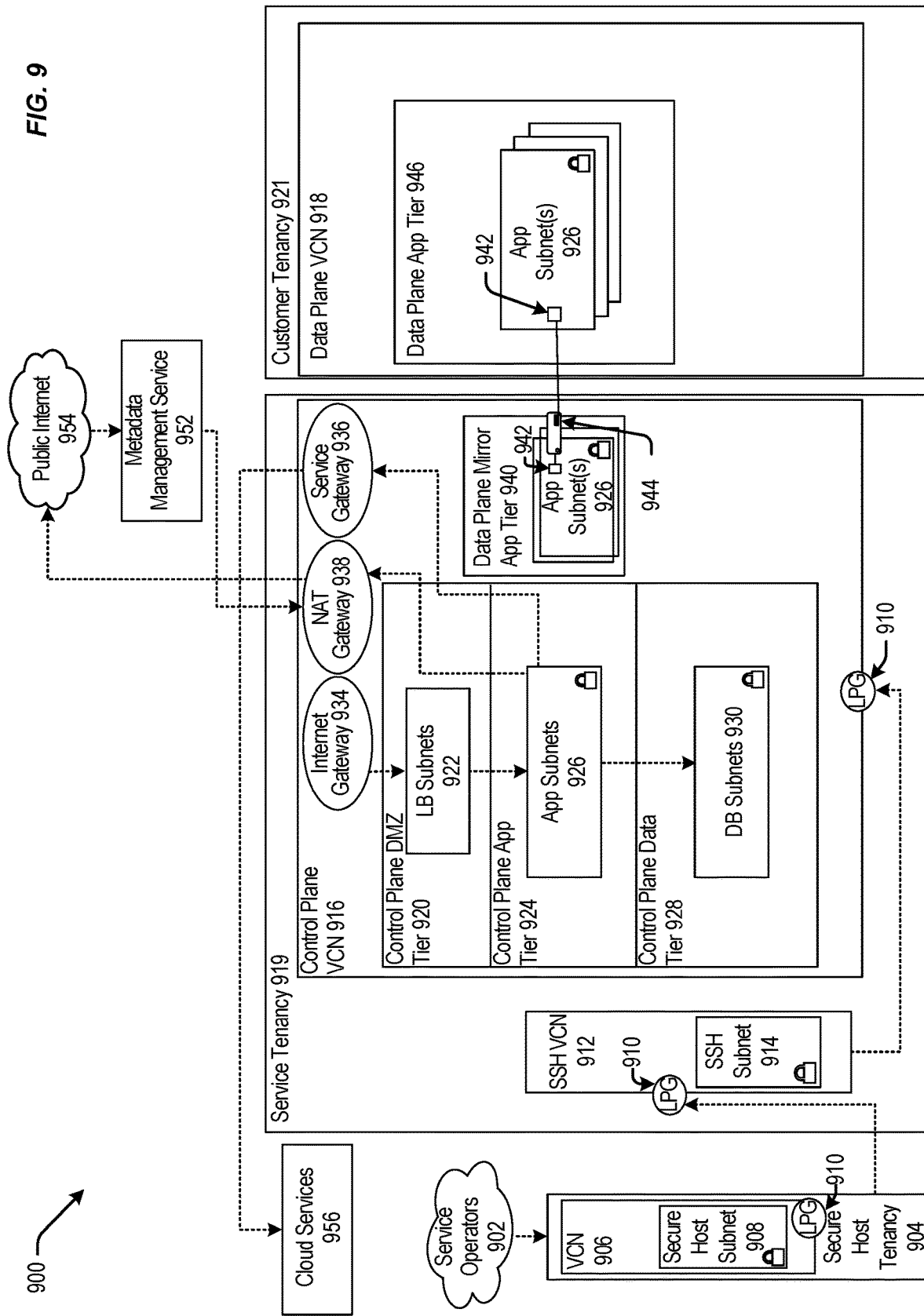
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG.

8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
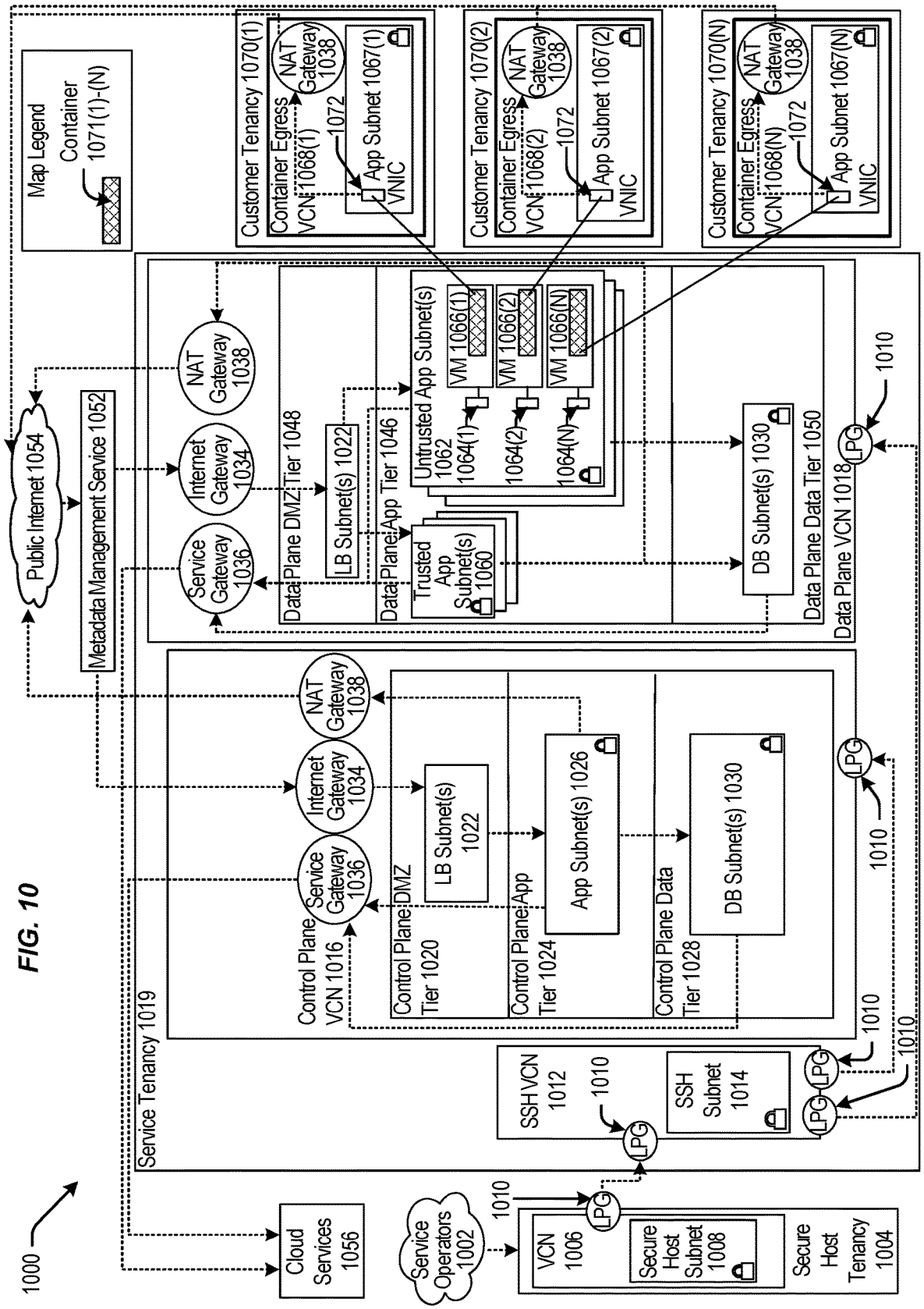
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024

(e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
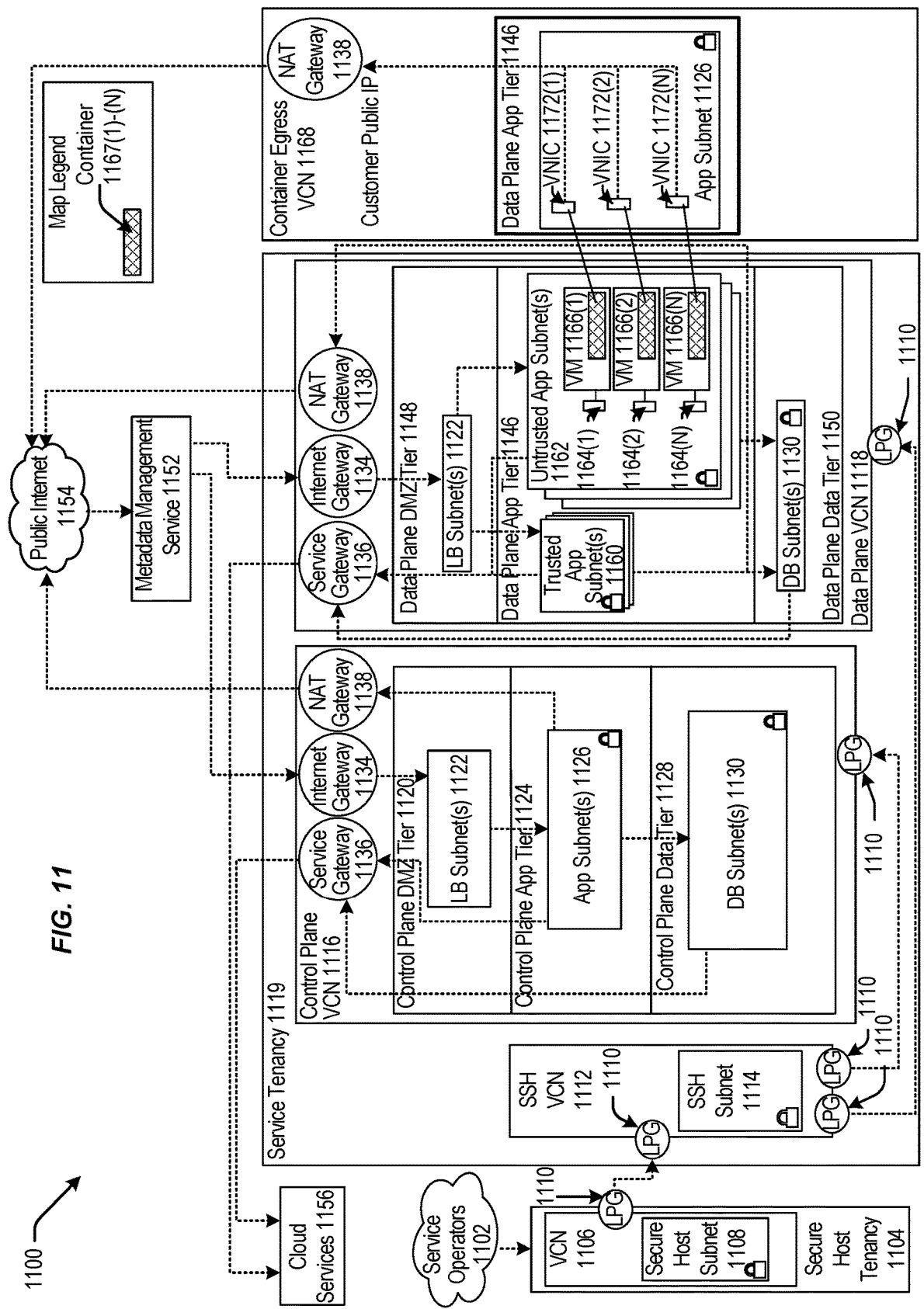
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
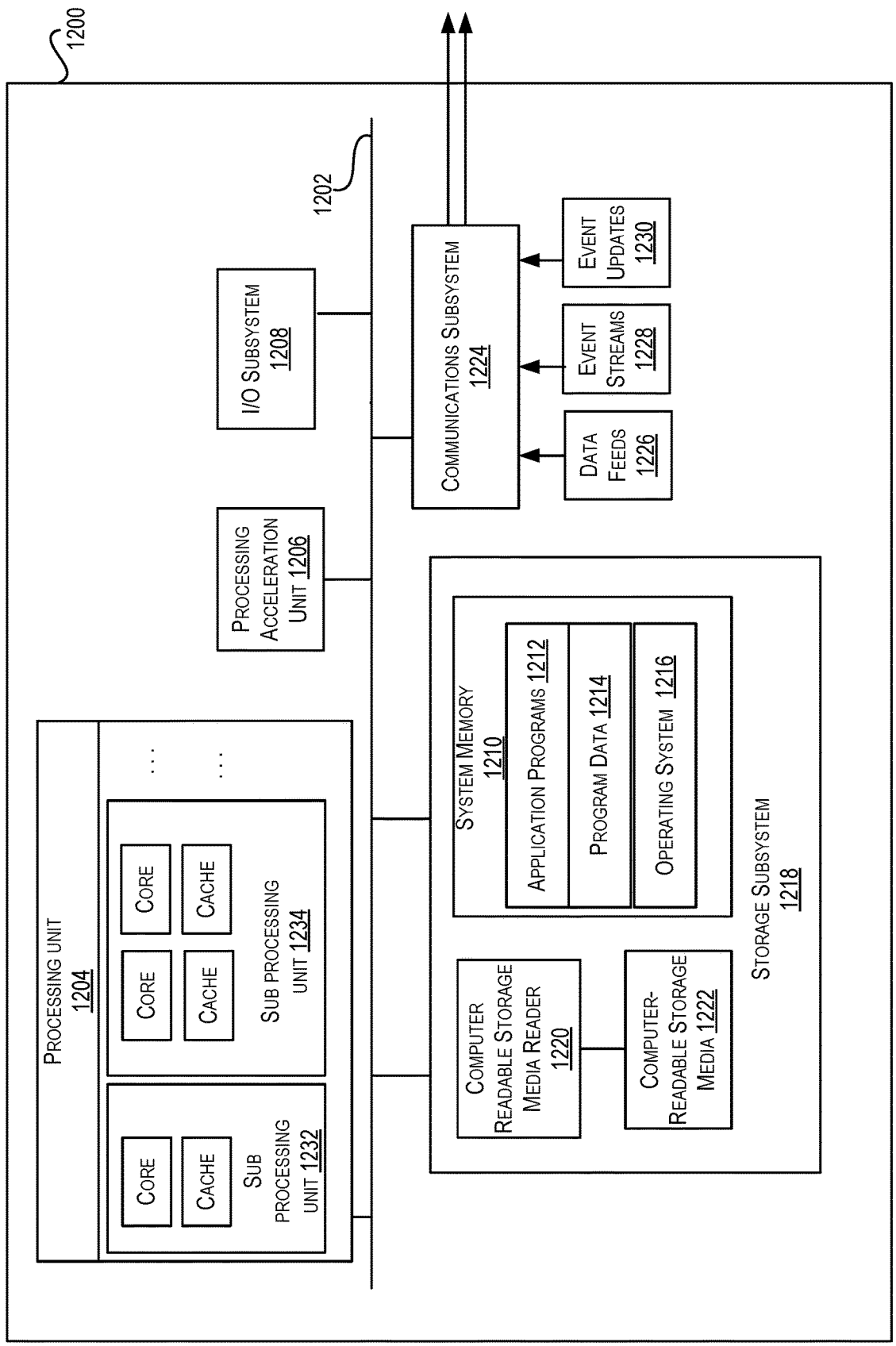
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    receiving, by a developer system, one or more environmental conditions to be associated with a software component that is to be deployed at a cloud computing environment, wherein a first environmental condition of the one or more environmental conditions indicates an environmental security configuration of the cloud computing environment, wherein the environmental security configuration is that the cloud computing environment is within an isolated network that does not require authentication of internal calls within the isolated network;
    encoding, by the developer system, the one or more environmental conditions;
    associating, by the developer system, the encoded one or more environmental conditions with the software component such that, at a later time when a deployment system is deploying a software package containing the software component at the cloud computing environment the deployment system has access to the encoded one or more environmental conditions, and wherein upon deployment of the software package at the cloud computing environment one or more properties of the cloud computing environment are checked to determine whether the one or more properties of the cloud computing environment satisfy the encoded one or more environmental conditions;
    instructing, by the deployment system, a condition checker system to determine whether the cloud computing environment satisfies the one or more environmental conditions;
    querying, by the condition checker system, a control plane of the cloud computing environment for one or more current values of one or more properties at one or more resources within the cloud computing environment as specified by the one or more environmental conditions to determine whether the one or more environmental conditions are satisfied by the cloud computing environment;
    receiving, by the control plane of the cloud computing environment, the query;
    sending, by the control plane of the cloud computing environment, to the condition checker system, a response indicating the one or more current values of the one or more properties at the one or more resources;
    comparing, by the condition checker system, the one or more current values of the one or more properties at the one or more resources with one or more expected values according to the one or more environmental conditions;
generating, by the condition checker system, a report indicative of results of the comparing, wherein the report indicates that the one or more environmental conditions are satisfied by the cloud computing environment;
providing, by the condition checker system, the report to the deployment system;
receiving, by the deployment system, the report;
identifying, by the deployment system, a set of one or more access action rules configured for at least one of the software package and the cloud computing environment;
determining, by the deployment system, based on the report and the set of one or more access action rules, to deploy the software component; and
deploying, by the deployment system, the software component at the cloud computing environment.

2. The method of claim 1, wherein associating the encoded one or more environmental conditions with the software component includes:
generating the software package, where the software package includes particular software component and the encoded one or more environmental conditions, and the method further comprising:
providing the software package to at least one of the deployment system and a repository.

3. The method of claim 2, wherein the environmental security configuration of the cloud computing environment specifies that a first property at a first resource should have a first value.

4. The method of claim 3, wherein the first resource is a subnet, wherein the first property is a network privacy configuration of the subnet, and wherein the first value is private.

5. The method of claim 1, wherein the environmental security configuration of the cloud computing environment is a network security configuration of the cloud computing environment.

6. A non-transitory computer-readable storage medium, storing computer-executable instructions that, when executed, cause one or more processors of a computer system to perform a method comprising:
receiving one or more environmental conditions to be associated with a software component that is to be deployed at a cloud computing environment, wherein a first environmental condition of the one or more environmental conditions indicates an environmental security configuration of the cloud computing environment, wherein the environmental security configuration is that the cloud computing environment is within an isolated network that does not require authentication of internal calls within the isolated network;
encoding the one or more environmental conditions; and
associating the encoded one or more environmental conditions with the software component such that, at a later time when a deployment system is deploying a software package containing the software component at the cloud computing environment, the deployment system has access to the encoded one or more environmental conditions, and wherein upon deployment of the software package at the cloud computing environment, one or more properties of the cloud computing environment are checked to determine whether the one or more properties of the cloud computing environment satisfy the encoded one or more environmental conditions.

7. The non-transitory computer-readable storage medium of claim 6, wherein associating the encoded one or more environmental conditions with the software component includes:
generating the software package, where the software package includes particular software component and the encoded one or more environmental conditions, and the method further comprising:
providing the software package to at least one of the deployment system and a repository.

8. The non-transitory computer-readable storage medium of claim 7, wherein the encoded one or more environmental conditions are included in the software package in the form of metadata, within a manifest file, or within a specific environmental conditions file.

9. The non-transitory computer-readable storage medium of claim 6, wherein associating the encoded one or more environmental conditions with the software component includes:
generating the software package, where the software package includes the software component, and wherein the method further comprises:
providing the software package to at least one of the deployment system and a repository; and
providing the encoded one or more environmental conditions and information about the software package to the repository, where the encoded one or more environmental conditions are stored at the repository along with an indication that the encoded one or more environmental conditions are associated with the software package.

10. The non-transitory computer-readable storage medium of claim 6, wherein the encoding the one or more environmental conditions includes creating multiple encoded forms of the one or more environmental conditions, each of the multiple encoded forms being suited to a different cloud structure.

11. A method, comprising:
receiving, by a condition checker system, information about a software package containing a software component that is to be deployed at a cloud computing environment or that has been deployed at the cloud computing environment;
identifying, by the condition checker system, a set of one or more environmental conditions associated with the software package, wherein a first environmental condition of the set of one or more environmental conditions indicates an environmental security configuration of the cloud computing environment, wherein the environmental security configuration is that the cloud computing environment is within a trusted network zone that executes code operated by a cloud computing service that provides the cloud computing environment;
querying, by the condition checker system, a cloud control plane of the cloud computing environment for one or more current values of one or more properties at one or more resources within the cloud computing environment as specified by the set of one or more environmental conditions to determine whether the set of one or more environmental conditions are satisfied by the cloud computing environment;
receiving, by the condition checker system, from the cloud control plane of the cloud computing environment, a response indicating the one or more current values of the one or more properties at the one or more resources;

comparing, by the condition checker system, the one or more current values of the one or more properties at the one or more resources with one or more expected values according to the set of one or more environmental conditions;

generating, by the condition checker system, a report indicative of results of the comparing, wherein the report indicates that the at least one of the set of one or more environmental conditions are not satisfied by the cloud computing environment; and providing, by the condition checker system, the report to a deployment system, thereby causing the deployment system to perform one or more actions based on the report, wherein the one or more actions include reconfiguring one or more properties at the cloud computing environment such that the at least one of the set of one or more environmental conditions that are not satisfied by the cloud computing environment become satisfied by the cloud computing environment before the software package is deployed.

12. A non-transitory computer-readable storage medium, storing computer-executable instructions that, when executed, cause one or more processors of a computer system to perform a method comprising:

receiving, by a condition checker system, information about a software package containing a software component that is to be deployed at a cloud computing environment or that has been deployed at the cloud computing environment;

identifying, by the condition checker system, a set of one or more environmental conditions associated with the software package, wherein a first environmental condition of the set of one or more environmental conditions indicates an environmental security configuration of the cloud computing environment, wherein the environmental security configuration is that the cloud computing environment is within a private subnet of a virtual networking service, the first environmental condition specifying that a first property at a first resource should have a first value, the first resource being a subnet, the first property being a network privacy configuration of the subnet, and the first value being private;

querying, by the condition checker system, the cloud computing environment by communicating with a cloud control plane of the virtual networking service for one or more current values of one or more properties at one or more resources within the cloud computing environment as specified by the set of one or more environmental conditions to determine whether the set of one or more environmental conditions are satisfied by the cloud computing environment;

receiving, by the condition checker system, from the cloud control plane of the virtual networking service, a response indicating the one or more current values of the one or more properties at the one or more resources;

comparing, by the condition checker system, the one or more current values of the one or more properties at the one or more resources with one or more expected values according to the set of one or more environmental conditions;

generating, by the condition checker system, a report indicative of results of the comparing, wherein the report indicates that the at least one of the set of one or more environmental conditions are not satisfied by the cloud computing environment; and providing, by the condition checker system, the report to a deployment system, thereby causing the deployment system to perform one or more actions based on the report, wherein the one or more actions include generating a warning signal and allowing the software package to be deployed without reconfiguring one or more properties at the cloud computing environment such that the at least one of the set of one or more environmental conditions that are not satisfied by the cloud computing environment remain unsatisfied by the cloud computing environment when the software package is deployed.

13. The non-transitory computer-readable storage medium of claim 12, wherein the set of one or more environmental conditions are included in the software package, and wherein identifying the set of one or more environmental conditions associated with the software package includes retrieving the set of one or more environmental conditions from the software package.

14. The non-transitory computer-readable storage medium of claim 12, wherein the set of one or more environmental conditions are stored in a repository as associated the software package, and wherein identifying the set of one or more environmental conditions associated with the software package includes communicating with the repository to retrieve the set of one or more environmental conditions based on the software package.

15. The non-transitory computer-readable storage medium of claim 12, wherein the cloud computing environment is hosted by an Infrastructure-as-a-Service provider.

16. The non-transitory computer-readable storage medium of claim 15, wherein the private subnet of the virtual networking service is built by a user with resources provided by the Infrastructure-as-a-Service provider.

17. The non-transitory computer-readable storage medium of claim 16, wherein the user set the first property at the first resource to have the first value.

18. The method of claim 1, further comprising:

receiving, by the condition checker system, information about a second software package containing a second software component that is to be deployed at a cloud computing environment;

identifying, by the condition checker system, a second environmental condition associated with the second software package indicating a second environmental security configuration of the cloud computing environment, wherein the second environmental security configuration is that the cloud computing environment is within a private subnet of a virtual networking service;

determining whether the second environmental condition is satisfied by the cloud computing environment; and generating, by the condition checker system, a second report indicative of results of the determining, wherein neither first software component nor the second software component are deployed until after the report and the second report are both generated, and wherein the first software component and the second software component are deployed as a group when the first environmental condition and the second environmental condition are both satisfied.

* * * * *